Aug. 29, 1961     L. A. BONDON     2,998,472

INSULATED ELECTRICAL CONDUCTOR AND METHOD OF MANUFACTURE

Filed April 23, 1958

INVENTOR.
LEWIS A. BONDON
BY Darby & Darby
ATTORNEYS

United States Patent Office 2,998,472
Patented Aug. 29, 1961

2,998,472
INSULATED ELECTRICAL CONDUCTOR AND METHOD OF MANUFACTURE
Lewis A. Bondon, 90 Yantacaw Brook Road, Upper Montclair, N.J.
Filed Apr. 23, 1958, Ser. No. 730,345
17 Claims. (Cl. 174—28)

The present invention relates to insulated electrical conductors and particularly to high and low voltage radio frequency cable, low loss balanced pair telephone cables, and other electrical applications, especially where low capacity or low loss features are of importance. The present invention also relates to a method of manufacture of insulated electrical conductors particularly adapted to the insulated electrical conductors of the present invention.

It is contemplated that the present invention will find greatest application in the field of radio frequency cables such as coaxial cables and accordingly the features of the present invention will be discussed primarily with reference to this application. It should be understood however, that the use of the present invention is not limited to radio frequency cables but that the present invention may be applied to other uses in the electrical art.

Many types of radio frequency cables of the coaxial type are known in the art. A basic problem exists with regard to these coaxial cables which has heretofore escaped satisfactory solution. Such cables have two conductors, an outer conductor generally of annular cross-section and an inner conductor having a common center, that is coaxial, with the outer conductor. The spacing between these conductors and the electrical properties of the intermediate material between these conductors has a profound influence upon the electrical characteristics of the cable. It is therefore necessary to support these conductors in such a way that they remain concentric and at the same time obtain the optimum electrical properties of the material in the space between the inner and outer conductors. Unfortunately, in the normal case the most desired property for the intermediate material is a low dielectric constant. The lowest dielectric constants obtainable are those of the vacuum, air or other gases.

From the foregoing explanation it will be seen that to obtain optimum electrical properties, there should be virtually no supporting structure between the inner and outer conductors; while to obtain the desired structural properties and thus maintain concentricity, a strong and continuous supporting structure should be provided.

In one approach to this problem the electrical characteristics are compromised and the space between the inner and outer conductor is filled with a solid dielectric material. The best solid dielectrics have substantially higher dielectric constants than that of air and other gases and thus produce inferior electrical properties. Even so the use of solid dielectrics does not completely solve the structural problem. Solid dielectric cables are commonly manufactured by extrusion and in the process of extruding the center conductor within the core of solid material it is exceedingly difficult to maintain the center conductor properly located in the center of the core of dielectric material.

A different approach to this problem has been to minimize the supporting structure and to fill the intermediate space between conductors with air or another gas. For example, beads of glass or ceramic material have been utilized in spaced positions along the cable center conductor to support the center conductor within the outer conductor. Spiral wedge type supports consisting of a spiral supporting structure wound on the center conductor have also been utilized.

Such structures, particularly when bent, often allow the center conductor to move from its concentric position; furthermore, in the case of beads, these are often broken if the cable is bent in the wrong place. All supporting structures in which the supporting elements are spaced periodically along the length of the cable are inclined to have an undesirable frequency sensitivity due to the fact that the frequency response of the cable is affected when the length of spacing between supporting elements correlates with the wavelength of a radio frequency signal in the operating frequency range of the cable.

Insulated electrical conductors according to the present invention utilize an array of insulating tubes laid about a conductor and pressed into contact with it to form a symmetrical array wherein the insulating cross-section provides a maximal amount of space and a minimal amount of dielectric mass. At the same time a high degree of structural integrity is provided so that the resulting arrangement utilizes the best features of solid dielectric and air dielectric support.

Insulated electrical conductors according to the present invention can be fabricated by a method herein disclosed which is of remarkable simplicity and thereby greatly reduces the labor cost of producing electrical conductors over that of more complicated production methods. The method which will be disclosed hereinafter is also capable of being practiced without specially constructed apparatus. Only simple well known types of cable-assembly and tube-drawing apparatus are required.

A preferred method of manufacture as later described in more detail consists primarily in assembling the insulating tubing and the conductor element or elements in a loose array corresponding to the desired final configuration and inserting the insulating tubing and conductors into a length of hard jacket while maintaining the general configuration of the array. Thereafter the jacket of metal, organic material or other semi-rigid material is drawn or otherwise reduced in size with respect to the cross-section of the tubing, or the tubing enlarged radially beyond its dimension at insertion, to cause the insulating tubes and conductors to be tightly packed into an array of the desired configuration. As a result the insulating tubing and the conductor or conductors are immovably secured within the hard jacket in a predetermined configuration which is designed to produce the desired electrical characteristics. The array of insulating tubes may be regularly oriented in a radial symmetrical arrangement.

Accordingly, in addition to the above described features and advantages provided by the present invention, it is an object of the present invention to provide an insulated electrical conductor in which a center conductor is secured within an outer jacket by reason of its placement in a configuration of insulating tubes which are arranged in a tightly packed array within the jacket.

It is another object of the present invention to provide a radio frequency cable having an outer conductive jacket and an inner conductor wherein the inner conductor is retained in position by reason of its placement in a configuration of non-conducting tubes placed within said jacket in a tightly packed array.

It is still another object of the present invention to provide a coaxial cable for the transmission of radio frequency energy comprising an outer conductive jacket of hard semi-rigid material and a self-centered inner conductor concentric with the outer jacket and secured in place by reason of its placement in a configuration of hollow insulating tubes located within the jacket and arranged in a tightly packed compressed array.

It is still another object of the present invention to provide a method of fabricating electrical conductors of the above and similar types which is simple in operation, requires a minimum of labor and involves the use of only simple conventional cable-assembling and tube-drawing apparatus.

Further objects and advantages will be apparent from a consideration of the following explanation in conjunction with the appended drawings, in which.

Figure 1:
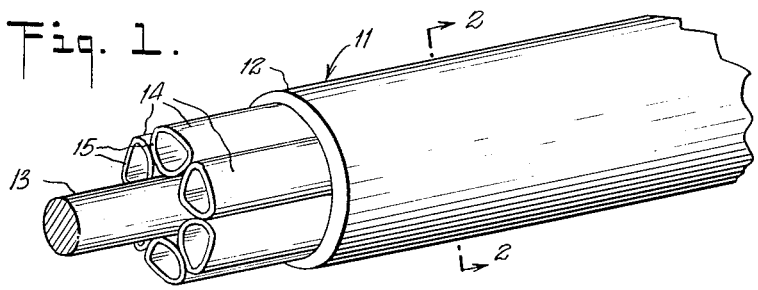
FIG. 1 is a perspective cutaway view of an insulated electrical conductor according to the present invention.

Referring now to the drawings, FIG. 1 shows an insulated electrical conductor in the form of a coaxial cable 11. The cable is formed with an external jacket 12 of conductive material such as aluminum or copper alloys. Obviously other materials could be utilized for the jacket 12. It is preferred that the jacket 12 be of a high-conductivity semi-rigid material, i.e., material often referred to in the trade as "semi-flexible" and which may be bent and re-formed without deformation or loss of electrical and mechanical advantages. The aluminum tubing of FIG. 1 is merely exemplary and the jacket could be formed of other metals or organic or other materials. Furthermore, the jacket 12 need not be in the form of tubing. It may, for example, be a wound armored type covering such as that utilized in the familiar "BX cable," or round wire or flat wire braiding.

Concentrically located within the jacket 12 is a center conductor 13. The center conductor 13 may be formed of copper or any other suitable conducting material such as aluminum. The center conductor 13 is shown to be solid in the cable illustrated in FIG. 1; however, the center conductor 13 may be hollow and in some cases this will be desirable to produce a saving of material and weight. The center conductor 13 is rigidly secured within the jacket 12 due to its placement within an array of tubes 14 of non-conducting or insulating material. In FIG. 1 the tubes 14 are formed with relatively thin walls 15 so that the volume between the center conductor 13 and the outer jacket 12 is filled primarily with air or such other gas as may be placed within the jacket 12.

As previously mentioned the use of an air dielectric in the major portion of the space between the center conductor 13 and the jacket 12 is highly desirable to produce a coaxial cable for the transmission of radio frequency energy which has optimum electrical characteristics. As previously pointed out however, the insulated electrical conductors according to the present invention are not limited to use for transmission of radio frequency energy and thus in some instances the use of gas or air throughout the major portion of the space between the center conductor 13 and the jacket 12 might be useless or undesirable. For example in some instances it might be desirable to fill the tubes 14 or the jacket 12 with fluids and in the case of liquids perhaps to circulate these liquids for cooling purposes or for other purposes.

It may be noted that the tubes 14 within the jacket 12 are not circular in shape. This is most readily apparent in FIG. 2. In some cases it might be desirable to form the tubes 14 in a non-circular shape but in the device shown in FIGS. 1 and 2, it is contemplated that the tubes 14 would originally be formed in circular shape and that they together with the center conductor 13 would be placed within the jacket 12 and forceably deformed to the shape shown in FIG. 2. It should further be understood that throughout the specification and claims the word "tube" is to be construed to include both filled and unfilled tubes and elongated rods whether they be hollow or not. For example, cellular rods of foamed plastic or elastomeric material may be used, such as foam rubber, foamed polyethylenes and polyurethanes.

Figure 2:
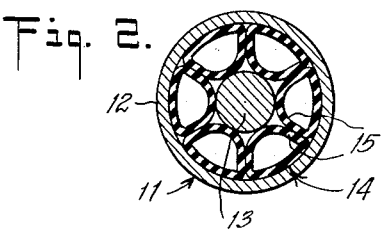
FIG. 2 is a transverse cross-sectional view of the insulated electrical conductor of FIG. 1 taken along the line 2—2 in FIG. 1.

The coaxial type insulated electrical conductor of FIGS. 1 and 2 is normally used for the transmission of radio frequency electrical energy and in such a case the sizes of the outer conductor or jacket 12 and the inner conductor 13 are of importance in determining the electrical characteristics of the coaxial cable. Also the properties of the material placed between the center conductor 13 and the jacket 12 are of importance in determining the electrical properties of the cable. To a lesser extent the properties of the conductive materials of which the jacket 12 and the center conductor 13 are formed are also important.

The manner in which the various characteristics of the cable such as cut-off frequency, power handling capability, attenuation, characteristic impedance, etc. are controlled by the dimensions and materials of the various elements is well known in the art and will not be discussed here. It will suffice to say that where the cable is to be used for the transmission of radio frequency energy it is generally desirable to provide as low an effective dielectric constant in the space between the inner conductor and the outer conductor as is possible. This is best accomplished by providing the maximum air space or gas space in this area.

When the cable of FIG. 1 is designed for 50 ohms characteristic impedance, a cable of three-eights inch nominal outside diameter may be constructed to give a nominal cutoff frequency of 15 kmc./s.; ½ inch O.D. to give 10 kmc./s. nominal cutoff; ⅞ inch O.D. to give 5000 mc./s. nominal cutoff, and one and ⅝ inch O.D. to give 2800 mc./s. nominal cutoff.

Polyethylene or Teflon (tetrafluoroethylene polymer) tubes may be utilized in the construction of the above described devices. It is obviously desirable to utilize a material for the tubes 14 (where they are to be used in radio frequency transmission cable) which has a minimum dielectric constant while still having sufficient physical strength and other necessary properties. As previously mentioned the tubes 14 may be either hollow, as would usually be the case for radio frequency energy transmission, or in some cases they may be solid. Many diverse types of insulating material can be utilized for the tubes 14 such as natural or synthetic rubber, neoprene, copolymers of butadiene and styrene or acrylonitrile, polyisobutylene, isoprene, polystyrene and vinyl compounds such as polymers and copolymers of vinyl chloride, vinyl acetate and vinylidene compounds. In addition the tubes can be made of reinforced material. For example the tubing can be made of glass fibres impregnated or reinforced with any of the above mentioned materials and additionally containing silicone or reinforcing silicone rubber.

Although various advantages and features of the insulated electrical conductors according to the present invention have been previously mentioned in general, particular advantages of the embodiment of FIGS. 1 and 2 are now explained in more detail.

By reference to FIG. 2 it will be seen that the tubes 14 completely surround the center conductor 13 and are pressed together so that a virtual wall separates the center conductor 13 from the jacket 12 and no air path is provided therebetween. This isolation of the center conductor 13 and the jacket 12 provides an increased voltage rating and added voltage breakdown protection. Many air dielectric type coaxial cables have a direct air gap between the inner and outer conductors and the increased isolation provided by the structure of FIGS. 1 and 2 provides a substantial improvement of the order of 20 percent, in voltage breakdown values over that of previous configurations with a lesser degree of isolation between inner and outer conductors.

It has previously been mentioned that it is generally desirable to minimize the amount of solid dielectric in the space between the center conductor 13 and the outer jacket 12; however, it is particularly important to minimize the amount of solid dielectric in contact with the center conductor at any point. The configuration of FIGS. 1 and 2 accomplishes this very effectively due to the fact that the contact between the nonconducting tubes 14 and the center conductor 13 is a firm tangential six point continuous line contact in any plane across the cable cross-section.

It should be further noted that the usual installation of cable of the type shown in FIGS. 1 and 2 requires that bends be made in the cable, and in any event, the cable is normally wound on a reel for shipping and unwound for use at the destination. With cable according to the present invention there is little or no tendency for the center conductor 13 to be dislodged from its center position in the jacket 12 and even if temporarily slightly dislodged due to coiling, it tends to be self-centering upon reassuming a straight line. At all times, relative longitudinal movement between the inner and outer conductors is restricted to a minimum. Obviously when a metal jacket such as aluminum is utilized in a configuration such as that shown in FIGS. 1 and 2, the cable has a very high resistance to crushing due both to the strength of the jacket and also to the array of tubes therewithin.

The cable of this invention is easily cut, dressed and handled without the necessity for special preparation or special tools. No bulky flaring tools, hot knives or irons are required as in the case of wedged or laminated membrane type supporting elements which require special treatment and handling where the outer jacket is removed.

Figure 3:
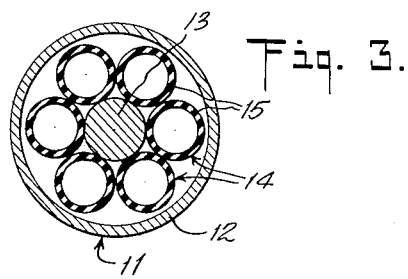
FIG. 3 is a cross-sectional view of the insulated electrical conductor of FIGS. 1 and 2 as it would appear during the course of manufacture.
Figures 4A, 4B:
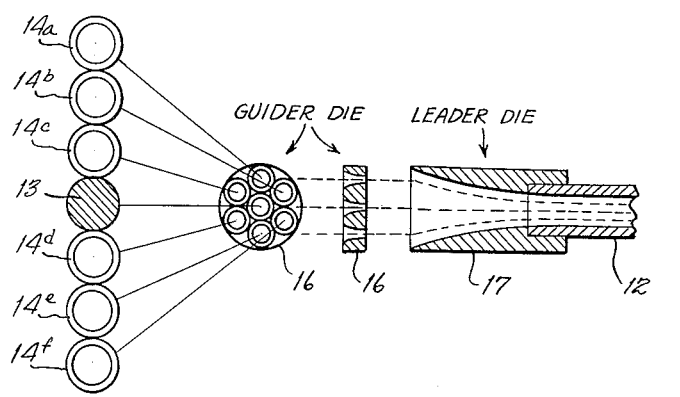
FIG. 4a is a schematic drawing illustrating the method of assembly of the elements of the insulated electrical conductor of FIG. 1.
FIG. 4b is a cross-sectional view of a set of dies which may be utilized in the assembly of the insulated electrical conductor of FIG. 1.

A particularly advantageous method of assembling insulated electrical conductors according to the present invention is illustrated in FIGS. 3, 4a and 4b. The method of manufacturing insulated electrical conductors is shown applied to the coaxial cable form of FIGS. 1 and 2, but it should be understood that the method of assembly will be generally applicable to other forms of the invention, some of which will later be described.

According to the presently described method the first step in the fabrication of insulated electrical conductor such as that shown in FIGS. 1 and 2 is to place the internal elements consisting of conductive and non-conductive tubes into a metal tube jacket which is ten to fifteen percent larger than the desired final dimension of the jacket. Preferably all the internal elements are placed in position simultaneously in the proper arrangement.

Referring to FIG. 4, this may be done by feeding the non-conductive tubes 14a, 14b, 14c, 14d, 14e, 14f, and the conductive center conductor 13 into a guider die 16. The ends of the internal elements passing through the guider die 16 may be gripped by any suitable harness arrangement which may be in turn attached to a long cord or cable in order that the internal elements may be drawn in proper array into the tube jacket 12.

In FIG. 4b, the guider die 16 is shown in cross-section and also a leader die 17 is shown which may be utilized to lead the internal elements into the end of the tube jacket 12 without scuffing or cutting the internal elements. The tube jacket 12 may be of any desired length and it is readily possible to fabricate the insulated electrical conductor in lengths as long as one thousand feet.

After the internal elements have initially been drawn into the tube jacket 12 the cross-section of the cable will appear as shown in FIG. 3. It will be noted that very little clearance and a minimum of longitudinal drag need be allowed to draw the arrayed internal elements consisting of tubes 14 and inner conductor 13 into the jacket 12. This is a particular advantage of the present arrangement which allows the cable to be fabricated by a simple procedure which does not require excessive reduction in cross-section of the outer jacket 12, thereby preserving a maximum degree of softness of the jacket as contrasted with prior procedures which required considerably greater die-down (reduction in diameter). The present procedure thus results in a much less undesirable degree of longitudinal molecular orientation or work-hardening of the metal jacket. Once the internal elements have been assembled within the outer jacket 12, the jacket 12 is reduced in diameter by drawing, rollswaging, or any suitable process to the desired diameter. Apparatus such as drawing benches and dies for reducing tubing is well known and is accordingly not illustrated. Other techniques may be used to envelop the array of tubes within the jacket, e.g. by extruding the metal of the jacket around the array as in conventional lead or aluminum press techniques.

Previously explained FIG. 2 shows the cross-section of the elements of FIG. 3 after the jacket 12 has been reduced to the desired diameter. Although substantial deformation has been made in the tubes 14 in FIG. 2 it is obvious that a lesser amount of deformation may be made. It is only necessary that the array of insulating tubes 14 and the inner conductor 13 be securely held to retain the inner conductor 13 in position in the center of the jacket 12.

Some advantages accrue from making the insulating tubes 14 of deformable material. For example, the reduced diameter of the outer jacket 12 is considerably less critical and any variation from the intended diameter is easily absorbed by more or less deformation of the insulating tubes 14.

From the foregoing description of the method of manufacture of the insulated electrical conductor it will be seen that a particularly simple method is provided. A primary advantage of the method is that no particular precautions for accurate positioning of the inner conductor within its supporting elements are necessary due to the fact that the inner conductor is automatically centered in its jacket 12 when the jacket is reduced due to the fact that the stresses in the various insulating tubes 14 will equalize themselves to center the inner conductor 13. This follows from the fact that the various tubes surrounding the inner conductor 13 are substantially identical and are uniform throughout their length. This is not a particularly critical condition however, and reasonable variations in the tubing 14 can be tolerated without producing an undue eccentricity of the center conductor 13.

Obviously many variations can be made in the particularly described method of manufacture. As an example the internal elements can be assembled in a desired configuration before or as they are placed in the jacket. Furthermore an armored type jacket can be wound over the internal elements rather than compressing a solid tube jacket on the elements as described.

It should further be noted that rather than compressing and contracting the jacket on the elements within the jacket, the elements may be placed within the jacket and thereafter expanded in order to secure them in the desired configuration. In forms where hollow non-conductive tubes are utilized for example, the tubes can be evacuated and sealed off so that they are at least partially flattened thereby changing their effective transverse dimension as an array to less than the inside transverse dimension of the jacket. The non-conductive tubes together with one or more conductors can then be assembled within a semi-rigid jacket and unsealed to allow them to return to an expanded cross-section thereby frictionally securing the conductive and non-conductive elements within the jacket.

Other methods may be used for contraction of the elements for placement within the jacket such as stretching or forcibly elongating the non-conductive tubes to cause them to contract in effective cross-section. This is applicable in the case where they are formed of extensible material. Furthermore, in any of the suggested methods heat treatment or chemical treatment such as partial or complete vulcanization may be utilized to set the expandable or deformable non-conductive elements after they are properly arranged within the jacket. Other variations in the particular method described will be obvious to those in the art.

Figure 5:
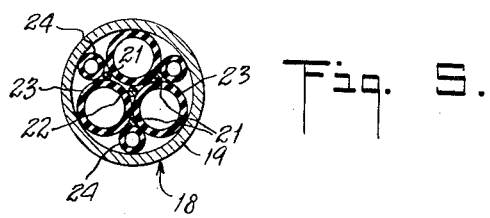
FIG. 5 is an alternative form of insulated electrical conductor according to the present invention illustrating a modified form of the invention.

FIG. 5 shows an alternative insulated electrical structure according to the present invention. Electrical cable 18 is formed of a semi-rigid outer jacket 19 which may be formed of aluminum alloy as in the previously described arrangement or may be formed of any other metal or organic material and may be conductive or non-conductive as determined by the particular application for which it is intended.

One conductor 22 is located in the center of the jacket 19 and three other off-center conductors 21 are located around the center conductor 22 and are spaced therefrom and from the jacket 19. The center conductor 22 is supported by non-conducting tubes 23 which are three in number rather than six in number as shown in FIGS. 1 and 2. This illustrates the fact that the number of tubes utilized may be varied to suit the particular situation. The off-center conductors 21 are supported by tubes 23 and also by smaller tubes 24.

In FIG. 5 it will be noted that there is little deformation of the supporting insulating tubes 23 or 24. Obviously these tubes could be deformed to a greater degree as shown in FIGS. 1 and 2 simply by producing a greater reduction in the diameter of the jacket 19 during the assembly of the cable. It may be noted that a method of assembling of the electrical cable of FIG. 5 may be similar to that described with reference to FIGS. 3, 4a and 4b.

The electrical cable 13 of FIG. 5 provides a four conductor cable (if the jacket is considered a conductor, a five conductor cable) wherein the spacing of the conductors is accurately controlled. Furthermore the interconductor capacity of this cable may be made very low compared with cables utilizing solid insulating or dielectric material. Such cable is useful in a number of applications, for example, in low loss balanced pair telephone cables.

In the previously explained forms of insulated electrical conductors according to the present invention it has been assumed that the tubes (such as 14) would lay straight in the cable from end to end, that is, they would not be spiralled or twisted about the center conductor 13. Any spiralling of the tubes in radio frequency transmission cable which produces a helical configuration has a definite periodicity at high frequencies and thus creates an undesirable frequency response in the radio frequency cable. In the cable shown in FIG. 5 however, or in other forms of insulated electrical conductors according to the present invention it might be desired to twist conductors and insulating tubes along the length of the cable. The increase in flexibility of the cable which would result from twisting might be desired in certain applications.

The electrical cable 18 shown in FIG. 5 may be slightly modified to produce a different form of coaxial cable from that shown in FIGS. 1 and 2, where it is desired to produce a coaxial cable having a higher characteristic impedance. Generally a higher characteristic impedance is produced by decreasing the diameter of the inner conductor relative to that of the outer conductor. The cable shown in FIG. 5 can be converted to a high impedance coaxial cable by the simple expedient of eliminating the off-center conductors 21 while leaving the center conductor 22. The resulting configuration will provide a high impedance coaxial cable which except for its characteristic impedance is substantially equivalent to the arrangement shown in FIGS. 1 and 2. If the off-center conductors 21 are removed it may be desirable to also remove the small supporting insulated tubes 24. Removing the tubes 24 will increase the amount of air space and thus increase the effective dielectric constant and will also of course reduce the complexity of the cable. On the other hand the small tubes 24 may be desired to give improved physical support even in the absence of off-center conductors 21.

FIG. 5 illustrates one form of multi-conductor cable which may be constructed according to the present invention. It is obvious however that the number of conductors which may be placed in such a cable is not limited to four as shown in FIG. 5. Any number of successive rings of non-conductive tubes may be built up to support a multi-conductor cable having any number of conductors. The tubes may be of the same size and design or they might be of different sizes as illustrated in FIG. 5. Conductors may be placed in all or in only part of the interstices between such supporting non-conducting tubes. Although it is contemplated that either coaxial or multiconductor cables according to the present invention will generally be utilized for the transmission of audio frequency or radio frequency signals, the use of the cables is not so limited.

From the foregoing explanation it will be seen that the present invention provides a number of types of insulated electrical conductors which are suitable for various applications and have many advantageous features, among which are simplicity of manufacture, ready availability of components, physical strength and superior electrical characteristics. A method of manufacture of great efficiency is also provided. Although a number of variations and modifications to the illustrated embodiments have been suggested it is obvious that numerous other variations of the invention may be made by those skilled in the art.

Accordingly the invention is not to be construed to be limited to the particular embodiments shown or suggested but is to be considered to be limited solely by the appended claims.

What is claimed is:

1. An insulated electrical conductor assembly comprising a hollow substantially cylindrical jacket, and a plurality of elongated elements within said jacket, at least one of said elongated elements being a conductor element with a peripherally continuous cross-section and at least three of which are substantially deformed hollow nonconductive elements of normally equal circular cross-section when in undeformed condition, said non-conductive elements being formed of resiliently deformable material, said elements being placed in a transversely ordered tightly packed array with said non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

2. An insulated electrical conductor assembly comprising a hollow substantially cylindrical jacket, and a plurality of elongated elements within said jacket, at least one of said elongated elements being a cylindrical conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly packed array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition and the size of said non-conductive elements being when in undeformed condition substantially the size which would place each of said elements in contact with at least three other of said elongated elements while they are in said array in undeformed condition.

3. An insulated electrical conductor assembly comprising a hollow substantially cylindrical jacket and a plurality of elongated elements within said jacket, at least one of said elongated elements being a conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly packed substantially parallel array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

4. An insulated electrical conductor assembly comprising a hollow substantially cylindrical jacket, and a plurality of elongated elements within said jacket, at least one of said elongated elements being a conductor element with a peripherally continued cross-section and at least three of which are substantially deformed hollow non-conductive elements of normally equal circular cross-section when in undeformed condition, said non-conductive elements being formed of resiliently deformable material, said elements being placed in a transversely ordered tightly-packed array with non-conductive elements being the outermost elements of said array, said array having a conductor element in the center thereof, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

5. An insulated electrical conductor assembly comprising a hollow substantially cylindrical conductive jacket, and a plurality of elongated elements within said jacket, at least one of said elongated elements being a conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly packed array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

6. An insulated electrical conductor assembly comprising a hollow substantially cylindrical jacket and a plurality of elongated elements within said jacket, one of said elongated elements being a conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly-packed array with non-conductive elements being the outermost elements of said array and with said conductor element in the center of said array, said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

7. An insulated electrical conductor assembly comprising a hollow substantially cylindrical jacket, and a plurality of elongated elements within said jacket, one of said elongated elements being a cylindrical conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly-packed array with non-conductive elements being the outermost elements of said array, and with said conductor element in the center of said array, said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

8. An insulated electrical conductor assembly comprising a hollow substantially cylindrical jacket, and a plurality of elongated elements within said jacket, one of said elongated elements being a conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly-packed substantially parallel array with non-conductive elements being the outermost elements of said array and with said conductor element in the center of said array, said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

9. An insulated electrical conductor assembly comprising a hollow substantially cylindrical conductive jacket, and a plurality of elongated elements within said jacket, one of said elongated elements being a conductor element with a peripherally continuous cross-section and at least three of which are substantially deformed hollow non-conductive elements of normally equal circular cross-section when in undeformed condition, said non-conductive elements being formed of resiliently deformable material, said elements being placed in a transversely ordered tightly-packed array with non-conductive elements being the outermost elements of said array and with said conductor element in the center of said array, said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

10. An insulated electrical conductor assembly comprising a hollow substantially cylindrical jacket, and a plurality of elongated elements within said jacket, at least two of said elongated elements being conductor elements and at least three of which are substantially deformed non-conductive elements of normally equal circular cross-section when in undeformed condition, said non-conductive elements being formed of resiliently deformable material, said elements being placed in a transversely ordered tightly-packed array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transvesre dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

11. An insulated electrical conductor assembly comprising a hollow substantially cylindrical jacket, and a plurality of elongated elements within said jacket, at least two of said elongated elements being cylindrical conductor elements and at least three of which are substantially deformed non-conductive elements of normally equal circular cross-section when in undeformed condition, said non-conductive elements being formed of resiliently deformable material, said elements being placed in a transversely ordered tightly-packed array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

12. An insulated electrical conductor assembly comprising a hollow substantially cylindrical jacket, and a plurality of elongated elements within said jacket, at least two of said elongated elements being conductor elements and at least three which are substantially deformed non-conductive elements of normally equal circular cross-section when in undeformed condition, said non-conductive elements being formed of resiliently deformable material, said elements being placed in a transversely ordered tightly-packed substantially parallel array with non-conductive elements being the outmost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

13. An insulated electrical conductor assembly comprising a hollow substantially cylindrical jacket, and a plurality of elongated elements within said jacket, at least two of said elongated elements being conductor elements and at least three of which are substantially deformed non-conductive elements of normally equal circular cross-section when in undeformed condition said non-conductive elements being formed of resiliently deformable material, said elements being placed in a transversely ordered tightly-packed array with non-conductive elements being the outermost elements of said array, said array having one of said conductor elements in the center thereof, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and the size of said non-conductive elements being when in undeformed condition substantially the size which would place each of said elements in contact with at least three other of said elongated elements while they are in said array in undeformed condition.

14. An insulated electrical conductor assembly comprising a hollow substantially cylindrical conductive jacket, and a plurality of elongated elements within said jacket, at least two of said elongated elements being conductor elements and at least three of which are substantially deformed non-conductive elements of normally equal circular cross-section when in undeformed condition, said non-conductive elements being formed of resiliently deformable material, said elements being placed in a transversely ordered tightly-packed array with non-conductive elements being the outermost elements of said array, each said conductor element being surrounded by non-conductive elements having their respective surfaces in continuous intimate contact with at least two adjacent non-conductive elements thereby avoiding any internal free path between conductive components of said assembly, said jacket having an inside transverse dimension less than the maximum transverse dimension of said array of elements in undeformed condition, and size of said non-conductive elements being when in undeformed condition substantially the size which would place each of said elements in contact with at least three other of said elongated elements while they are in said array in undeformed condition.

15. The method of manufacturing an insulated conductor assembly comprising the steps of placing a plurality of elongated elements into a hollow elongated jacket of permanently deformable material, said elongated elements including at least one conductor element and at least three substantially equal-diameter cylindrical resiliently deformable non-conductive elements, said elongated elements being placed into said jacket in an array in which each elongated element may simultaneously be placed in tangential contact with at least three other elongated elements without substantial deformation of any of said elements, the inside dimension of said jacket being larger than said array of elongated elements; and progressively reducing the transverse dimension of said jacket throughout its length to cause said elongated elements progressively along the length of the jacket to be placed in a stable array of predetermined form with each of said elongated elements in tangential contact with at least three other of said elements and to cause said nonconductive elements to be deformed by the progressive reduction of said jacket dimension.

16. The method of manufacturing an insulated conductor assembly comprising the steps of placing a plurality of elongated elements into a hollow elongated jacket of permanently deformable material, said elongated elements including at least one conductor element and at least three substantially equal-diameter cylindrical resiliently deformable non-conductive elements, said elongated elements being placed into said jacket in an array in which each elongated element may simultaneously be placed in tangential contact with at least three other elongated elements without substantial deformation of any of said elements, the inside dimension of said jacket being larger than said array of elongated elements but small enough to prevent any of the elongated elements from being transposed in said array; progressively reducing the transverse dimension of said jacket throughout its length to cause said elongated elements progressively along the length of the jacket to be placed in a stable array of predetermined form with each of said elongated elements in tangential contact with at least three other of said elements and to cause said non-conductive elements to be deformed by the progressive reduction of said jacket dimension; and removing the excess length of said jacket due to elongation resulting from said reduction of the transverse dimension.

17. The method of manufacturing an insulated conductor assembly comprising the steps of pulling a plurality of elongated elements into a hollow cylindrical elongated jacket of permanently deformable material through a guide to cause said elongated elements to be placed into said jacket in an array in which each elongated element may simultaneously be placed in tangential contact with at least three other elongated elements without substantial deformation of any of said elements, said elongated elements including at least one conductor element and at least three substantially equal-diameter cylindrical resiliently deformable non-conductive elements, the inside of said jacket being larger than said array of elongated elements but small enough to prevent any of the elongated elements from being transposed in said array and drawing said jacket through a die to progressively reduce the transverse dimension of said jacket throughout its length to cause said elongated elements progressively along the length of the jacket to be placed in a stable array of predetermined form with each of said elongated elements in tangential contact with at least three other of said elements and to cause said non-conductive elements to be deformed by the progressive reduction of said jacket dimension; and cutting off the excess length of said jacket due to elongation resulting from said drawing process.

References Cited in the file of this patent

UNITED STATES PATENTS

| | | |
|---|---|---|
| 1,700,434 | Dodge | Jan. 29, 1929 |
| 1,921,606 | Cremer | Aug. 8, 1933 |
| 1,987,918 | Waring | Jan. 15, 1935 |
| 2,468,091 | Maddock | Apr. 26, 1949 |
| 2,488,211 | Lemon | Nov. 15, 1949 |
| 2,556,244 | Weston | June 12, 1951 |

FOREIGN PATENTS

| | | |
|---|---|---|
| 217,000 | Great Britain | June 12, 1924 |
| 647,150 | Germany | July 1, 1937 |

OTHER REFERENCES

Electronic Design, March 19, 1958, page 42 relied on.